United States Patent [19]

Rodrigues, Jr. et al.

[11] 4,426,096
[45] Jan. 17, 1984

[54] BRIDGE CART

[76] Inventors: John G. Rodrigues, Jr., Rte. 1, Box 121; Gale F. Rettkowski, Rte. 1, Box 119; William H. Jessup, Rte. 1, all of Wilbur, Wash. 99185

[21] Appl. No.: 370,726

[22] Filed: Apr. 22, 1982

[51] Int. Cl.³ .............................................. B62D 53/04
[52] U.S. Cl. ............................ 280/411 C; 280/476 A; 280/490 R
[58] Field of Search ............... 280/411 R, 411 C, 412, 280/408, 410, 476 R, 476 A, 490 R, 415 A; 222/621

[56] References Cited

U.S. PATENT DOCUMENTS

| 2,275,302 | 8/1939 | Magnuson | 280/5 R |
|---|---|---|---|
| 2,379,265 | 6/1945 | Whitmer | 280/476 R |
| 2,515,705 | 7/1950 | Gardiner | 280/476 R |
| 2,563,372 | 8/1951 | Risse | 280/479 |
| 2,570,482 | 10/1951 | Pruitt | 280/476 R |
| 2,596,390 | 5/1952 | Essick | 280/43 |
| 2,912,944 | 11/1959 | Snow et al. | 222/621 X |
| 3,428,335 | 2/1969 | Clark | 280/479 |
| 3,734,540 | 5/1973 | Thiermann | 280/482 |
| 4,078,823 | 3/1978 | McBride | 280/490 R |
| 4,230,335 | 10/1980 | Glassmeyer | 280/423 A |

FOREIGN PATENT DOCUMENTS

| 164672 | 8/1955 | Australia | 280/476 R |
|---|---|---|---|
| 459574 | 10/1926 | Fed. Rep. of Germany | 280/410 |
| 594291 | 12/1932 | Fed. Rep. of Germany | 280/410 |

*Primary Examiner*—John A. Pekar
*Attorney, Agent, or Firm*—Wells, St. John & Roberts

[57] ABSTRACT

A cart that is connectable between an agricultural implement and a tractor, for carrying bulk material for application simultaneously with operation of the agricultural implement. The cart includes a longitudinally and elevationally adjustable tongue assembly that enables selective adjustment of the longitudinal distances from the tractor to the cart and between the cart and implement. The cart is supported on fixed axle mounted wheels that may provide driving power to pump the bulk material.

13 Claims, 5 Drawing Figures

1

BRIDGE CART

FIELD OF THE INVENTION

The present invention relates to interconnection of a tractor and an agricultural implement by an intermediate cart assembly.

BACKGROUND OF THE INVENTION

There is an ever increasing interest in combining field operations to improve economy in crop production, decrease labor, and reduce maintenance on equipment. For example, operations of cultivating and fertilizing could be combined. In fact, fertilizer application can be combined with any of several operations, including seeding, cultivating, weeding, etc. Application of other materials such as herbicides, insecticides, or other treatments may also be properly applied in conjunction with other field operations.

Existing carts have been produced for attachment behind the drawn implement or that may be mounted intermediate the tractor and implement. Existing intermediate carts substantially lengthen the distance between the tractor and implement. This increased length results in poor tracking characteristics of the implement behind the tractor, especially on uneven terrain. Additionally, the tractor may leave tracks on turns that cannot be covered by the trailing implement. A cart mounted between a tractor and towing vehicle will often impede the turning capability of the tractor and attached implement. The implement tongue may pivot into abutment with the intermediate cart wheels on sharp turns. Likewise, the cart wheels can interfere with the tractor on sharp turns. Prior forms of intermediate carts also obstruct visibility of the attached implement from the tractor operator's station.

Known forms of carts mounted between the tractor and implement make use of "crazy wheels" for support. "Crazy wheels" pivot about vertical axes and rotate on horizontal axes. This presents a problem when the cart is moved to a sidehill situation. The weight of the cart shifts on the sidehill, causing the crazy wheels to point downhill. The tendency is thus for the cart to lead the implement downhill. This is a frustrating experience for the farmer who would like the implement to track straight behind his tractor.

Another problem with "crazy wheel" carts is that the "crazy wheels" cannot be used to drive accessories by reason of their free pivotal nature. Expensive and cumbersome drive arrangements must then be provided independently of the "crazy wheels". This involves more than the simple addition of an auxiliary wheel for a direct drive purpose; there must be enough weight distributed over the wheel for driving traction. If there is not enough weight over the wheel, the wheel will seize and skid over the ground from the drag of the drive mechanism. Too much weight on the wheel and the "crazy wheels" become ineffective.

The need therefore remains to effectively combine operations without sacrificing handling characteristics between the tractor and towed implement. It is also desirable to obtain some form of auxiliary material container and applicator arrangement that may be used to interconnect nearly any drawn implement to nearly any form of tractor.

BRIEF DESCRIPTION OF THE DRAWINGS

A preferred form of the present invention is illustrated in the accompanying drawings in which.

DETAILED DESCRIPTION OF A PREFERRED EMBODIMENT

The following disclosure is submitted in compliance with the constitutional purposes of the patent laws to "promote the progress of science and the useful arts" (Article 1, Section 8).

Figure 4:
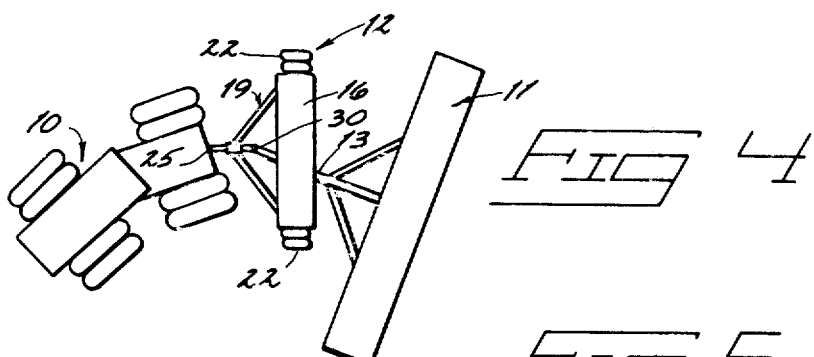
FIG. 4 is a diagrammatic view illustrating the present cart in a turning situation with a tractor and drawn implement.
Figure 5:
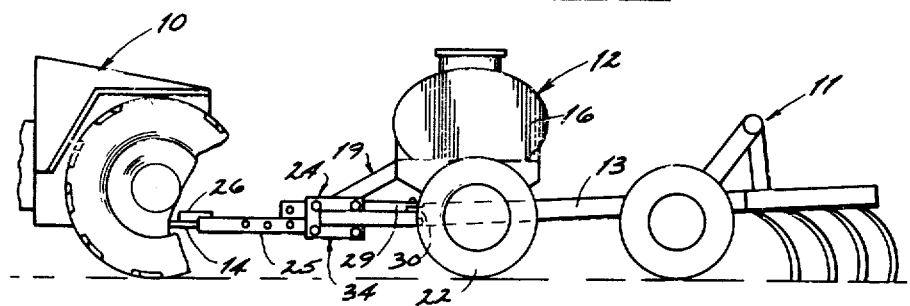
FIG. 5 is a diagrammatic side view illustrating an operational position of the tongue connecting members of the present cart opposite that shown in FIG. 2.

FIGS. 4 and 5 diagrammatically illustrate a tractor 10, an implement 11, and the present bridge cart at 12. The present cart 12 is used intermediate the tractor 10 and implement 11. It includes mechanisms by which the implement 11 can be attached to the tractor 10 for usual groundworking operations. For purposes of later description, the implement 11 is described as having an elongated tongue 13 extending forwardly. Furthermore, the tractor 10 is shown to include a drawbar 14 (FIG. 5). Further details of the tractor 14 and implement 11 are unessential for this disclosure since the present cart 12 can be used with a substantial variety of tractors and implement combinations.

Figure 1:
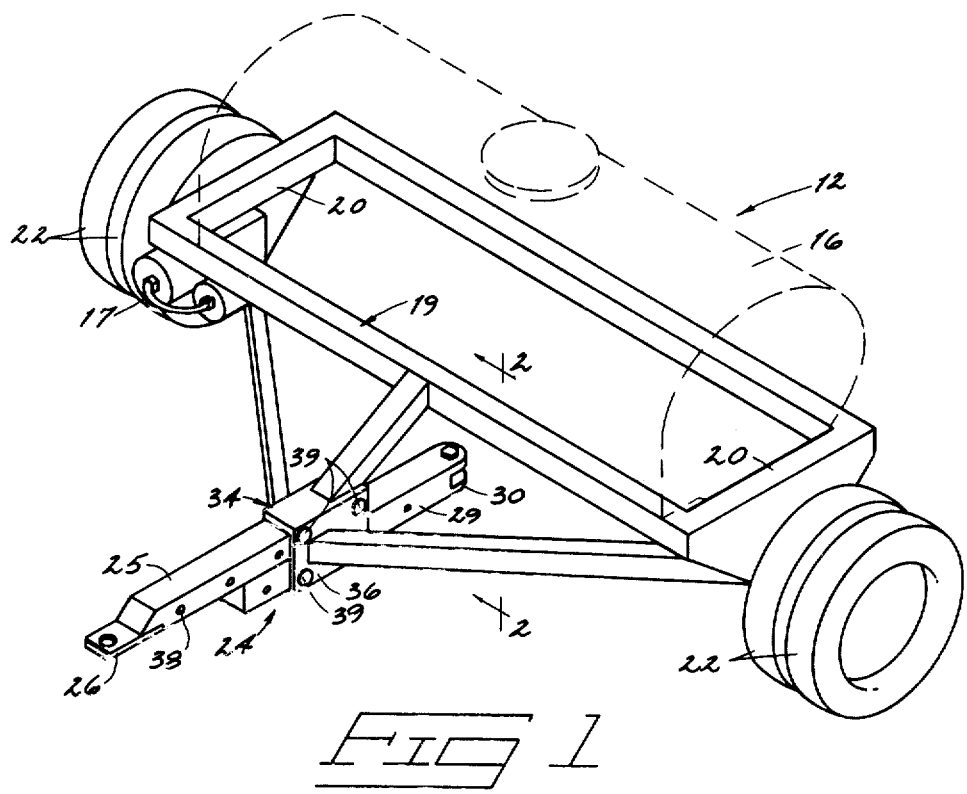
FIG. 1 is a pictorial view of a preferred form of the present cart.

The present cart 12 may be used as illustrated in FIG. 1 to support a material container 16 such as a tank. The container 16, it is noted, can be used to contain liquids such as water, liquid fertilizers, herbicides, and insecticides, or a hopper may be provided for carrying granular materials such as dry fertilizer or even seed. A pump means 17 is provided for delivering whatever material is carried by the cart rearwardly to appropriate delivery mechanisms (not shown) well known in the industry.

The cart 12 includes an elongated frame 19. The frame is preferably elongated in a transverse direction and is substantially rectangular as shown in FIGS. 1 and 4. The frame preferably extends to opposed ends 20.

Figure 3:
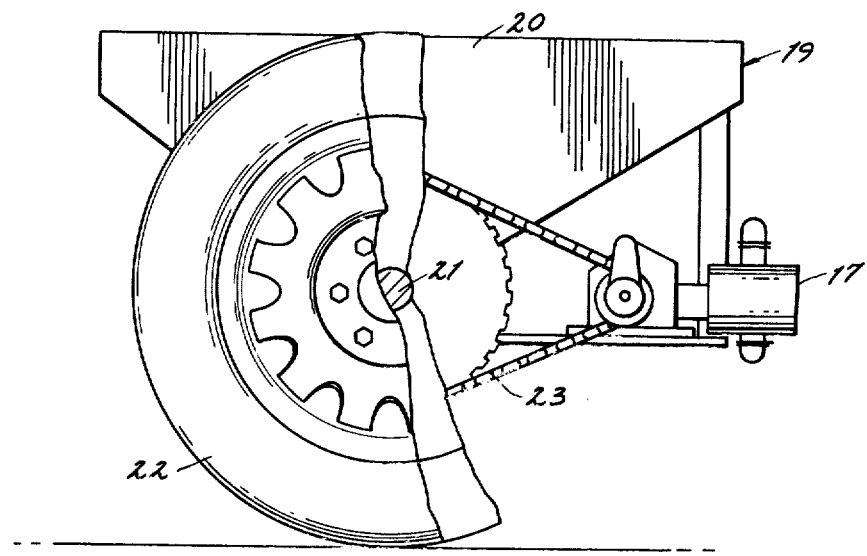
FIG. 3 is an enlarged detail view of a drive mechanism.

Axles 21 (FIG. 3) are mounted to the frame ends 20 along a fixed transverse axis. Ground supporting wheels 22 are mounted to the axles 21 for rotation about the fixed axis.

There are important features to consider about the wheel and axle arrangements. Firstly, the distance between the wheels 22 is substantial. In fact, it is desirable to include a transverse space between the wheels 22 that is somewhat greater than the overall width dimension (the transverse dimension between wheels on the tractor). The wide stance of the cart enables close connection between the cart and tractor while still allowing for mobility of the tractor without interference from the wheels 22 or frame 19. Furthermore, the wide stance allows for mounting of a large capacity container 16 on the frame 19 without increasing the overall height of the cart unit. This allows for greater visibility from the controller's seat of the tractor.

Stability of the cart is enhanced by the wide stance of the wheels and, by virtue of the increased stability, the wheels 22 can be mounted for rotation about fixed axes on the axles 20. This differentiates from the existing forms of carts, since most make use of "crazy wheels" or caster type wheels that pivot about vertical axes as well as independent rotational axes. The wheels 22 rotate about a wheel axis that is fixed relative to the frame so they will turn only when the frame is turned. This eliminates the tendency of "crazy wheel" carts to swing downhill when pulled along a sidehill. Instead, the cart tracks directly behind the tractor. Even if there is some side slip of the cart downhill, the wheels will be turned upwardly toward the tractor and the tendency will be for the cart to climb back to its normal tracking position.

By virtue of the fixed axes, positive driving connection is provided at 23 (FIG. 3) between the wheels 22 and pump means 17. The full cart weight is exerted against the wheels so there is always sufficient traction to operate the drive means 17. In fact, two pumps can be mounted to the frame; one for each of the axles 20.

The cart 12 is interconnected between the tractor 10 and implement 11 by a tongue assembly that is generally indicated at 24. The tongue assembly 24 is bridged overhead by the frame 19 so that there is maximum turning clearance between the wheels 22 and the implement tongue 13.

The tongue assembly 24 is adjustably mounted to the frame between wheels 22 and extends longitudinally from a forward hitch member 26 to a rearward hitch member 30. Hitch member 26 is mounted to a first tongue member 25 for attachment to the drawbar 14. Hitch member 30 is mounted at the end of a second tongue member 29 for attachment to the tongue 13 of implement 11.

Figure 2:
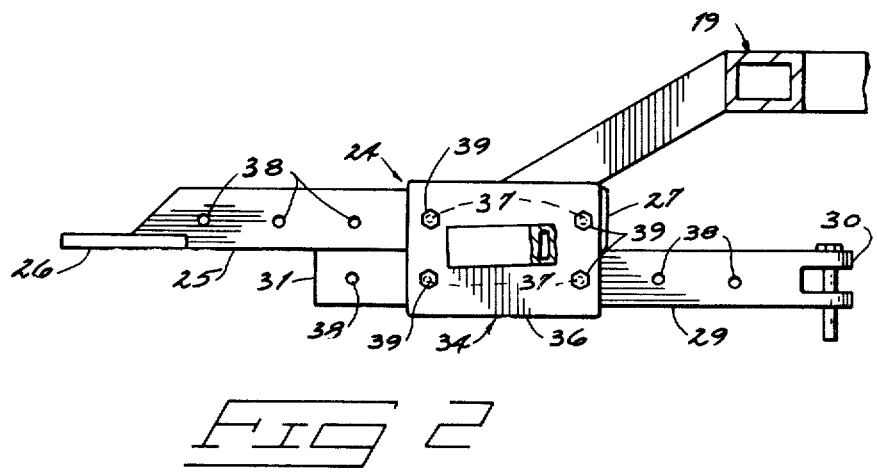
FIG. 2 is an enlarged section view as taken along line 2—2 in FIG. 1.

The first and second tongue members 25, 29 are preferably formed of a rectangular channel having a continuous cross-sectional configuration extending between the hitch members 26 and 30 to free remaining ends 27 and 31 respectively. The rectangular configuration allows the tongue members to be slidably positioned, one on another, and secured by a bracket means 34 to the frame 19. The hitch member 26 is mounted closely adjacent to one of the rectangular side surfaces of the first tongue member 25 to facilitate elevational adjustment of the tongue member in relation to the remainder of the tongue assembly 24. This may be done simply by turning the tongue member 25. FIG. 2 shows the tongue member 25 turned so the hitch member 26 appears on the bottom surface of the tongue member 25. In FIG. 5, the hitch member appears on the top surface. Such adjustability facilitates elevational compensation between the tractor drawbar 14 and the implement tongue 13.

The bracket means 34 is located on the frame to mount the tongue members 25 and 29 to extend in opposite longitudinal directions. Bracket means 34 is especially adapted to mount the members 26 and 29 with their ends 27, 31 overlapping for longitudinal adjustment relative to the frame. The distance between the frame or a point on the frame and one of the hitch members can be varied without altering the longitudinal distance between the same point on the frame and the remaining hitch member.

Bracket means 34 may be comprised of a plate 36 rigidly affixed to the frame 19. It is preferred that the plate 36 be in the form of a longitudinally open channel to receive the tongue members 25 and 29 in elevationally stacked relationship. It is also desirable that the plate 36 be positioned midway between the wheels 22 and on the underside of frame 19.

Plate 36 includes two sets of longitudinally spaced mounting apertures 37 (FIG. 2). Apertures 37 are spaced to align with longitudinally spaced holes 38 formed through the respective tongue members 25 and 29. Any adjacent pair of holes 38 can be positioned to align with matching apertures 37 of the plate 36. The individual tongue members can be independently adjusted longitudinally with respect to the bracket. Mounting pin assemblies 39 are provided to releasably secure the tongue members in their selected longitudinal positions to the bracket means 34.

It is pointed out that the distance between holes 37 for each of the tongue members is equal. The tongue members can thus be interchanged elevationally as demonstrated by FIGS. 2 and 5, providing further elevational adjustment between the towing tractor 10 and the point of connection to the drawn implement 11.

Independent longitudinal adjustment of the tongue members 25 plus the elevational adjustment capable through the hitch member 26 and the separate tongue members 25, 29 allow the present cart 12 to be mounted between nearly any modern tractor 10 and implement 11.

The present cart 12 is attached to a tractor in the same manner as an ordinary implement is attached to the tractor. The tongue assembly 24 therefore becomes an extension of the drawbar 14, pivoting at the connection between the drawbar 14 and first tongue member 25.

The implement 11 may be connected by its tongue 13 to the hitch member 30 of the present cart. This is done in the same manner as when the implement is attached to the tractor drawbar. Elevational difference between the implement tongue 13 and tractor drawbar 14 can be accommodated by selectively turning the first tongue member 25 to position hitch member 26 and/or by alternating the elevational positions of tongue members 25 and 29. There are several possible combinations of adjustments that may be made to facilitate proper elevational differences between the tractor drawbar and implement tongue.

Longitudinal adjustment of the individual tongue members is accomplished to produce the shortest possible overall distance between the hitch point of the implement tongue 13 and the tractor drawbar 14. This is done so the overall handling characteristics between the tractor and implement are changed only minimally by the cart 12. A minimal tongue length can be achieved through provision of the two independently adjustable tongue members. Firstly, a desirable distance between the cart 12 and the tractor 10 can be accommodated by adjustment of the first tongue member 25. In adjusting the tongue member, the operator considers the sharpest radius through which the tractor will be turning. Sufficient clearance is then allowed so the tractor wheels will not interfere with the frame during tight turns. A similar consideration is made in adjusting the length of the second tongue member 29. Another consideration involved with proper selection of length for second tongue member 29 is the configuration of the implement tongue. If the implement tongue is relatively short and includes heavy diagonal bracing, additional length may be desirable between the tongue 29 and frame 19 to allow for free pivotal motion between the frame 19 and the implement tongue frame. However, if the implement tongue is long and unobstructed, the second tongue member can be shortened to a minimum length.

With the adjustment features described above, handling of the tractor and trailing implement is affected only minimally by the interposition of the present cart.

The close coupling between the tractor and implement provided for by the adjustable tongue members allows turns at minimum radii. Side hill drift of the cart and implement are both reduced by the shortened connection. There is a tendency for implements having excessively long tongues to drift or slide downwardly when being pulled along a side hill. The short tongue of the present cart causes an uphill turning motion of the cart at the first instance of downhill drift, causing the cart to right itself upwardly and thereby causing the same effect on the trailing implement.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A cart mountable between a tractor and the tongue of an agricultural implement, comprising:
   a wheel supported frame;
   a first elongated tongue member having a hitch member at one end for connection to the tractor, and a remaining end;
   a second elongated tongue member having a hitch member at one end for connection to the implement tongue, and a remaining end;
   bracket means on the frame mounting the tongue members with the hitch members extending longitudinally in opposite directions for individual longitudinal adjustment relative to the frame such that the longitudinal distance between the frame and one of the hitch members can be varied without altering the longitudinal distance between the frame and the remaining hitch member;
   wherein the bracket means mounts the tongue members with the remaining ends thereof in an overlapping relationship and with one of the tongue members being situated elevationally above the other; and
   wherein the tongue members can be interchanged elevationally to adjust the effective height from the ground surface to the hitch members.

2. The cart of claim 1 wherein the frame is rectangular and elongated in a transverse direction, and is supported by ground engaging wheels at opposed ends thereof; and
   wherein the bracket means mounts the tongue members between the frame and the ground surface.

3. The cart of claim 1 wherein the tongue members are rectangular in cross section and are received with their remaining ends in overlapping relation by the bracket means and wherein one of the hitch members is mounted along a single side surface of the associated tongue member to be turned to face upwardly or downwardly, thereby allowing elevational adjustment of the hitch member with respect to the other hitch member and to the ground surface.

4. The cart of claim 1 wherein the bracket means includes a plate fixed to the frame with longitudinally spaced mounting apertures formed therein, and wherein the tongue members include similar longitudinally spaced mounting apertures for alignment with the plate apertures; and mounting pin assemblies received through aligned plate and tongue mounting apertures to secure the tongue members to the bracket and frame.

5. The cart of claim 1 wherein bracket means is situated on the frame to mount the tongue members elevationally between the frame and ground surface and to enable connection to the hitch member of the second member with the tongue of the implement directly below the frame.

6. The cart of claim 1 wherein the frame is transversely elongated and includes wheel axles at outward frame ends, mounting ground engaging wheels for free rotational movement thereon about a fixed rotational axis.

7. A cart mountable between a tractor and the tongue of an agricultural implement, comprising:
   an elongated frame extending transversely in relation to the path of travel of the tractor, to opposed ends;
   wherein the frame width dimension between the opposed ends is greater than the width of the tractor to minimize height requirements of any load to be carried on the frame and maximize trailing characteristics of the cart;
   axles mounted on the frame at the ends thereof along a wheel axis;
   ground supporting wheels mounted to the axles for free rotation about the wheel axis;
   an adjustable tongue assembly on the frame between the wheels and extending longitudinally from a hitch member at one end adapted for connection to the tractor and to another hitch member at an opposite end for connection to the implement.

8. The cart of claim 7 further comprising a bulk material storage container on the frame and a pump mounted to the frame and driven by one of the ground engaging wheels, adapted to pump material from the container.

9. The cart of claim 7 wherein the tongue assembly is bridged overhead by the frame such that there is maximum turning clearance between the ground supporting wheels and the tongue of an implement attached to the tongue assembly.

10. The cart of claim 7 wherein the tongue assembly is adjustable longitudinally to selectively position the point of connection between the tongue assembly and the tongue of the implement in relation to the frame.

11. The cart of claim 7 wherein the tongue assembly is elevationally adjustable to accommodate tractors and implements having hitch members at different elevations.

12. The cart of claim 7 wherein the adjustable tongue assembly includes:
   a first elongated tongue member having a hitch member at one end adapted to be connected to the tractor and a remaining end;
   a second elongated tongue member having a hitch member at one end adapted to be connected to the implement tongue and a remaining end; and
   bracket means on the frame mounting the tongue members with the hitch members extending longitudinally in opposite directions for individual longitudinal adjustment relative to the frame such that the longitudinal distance between the frame and one of the hitch members can be varied without altering the longitudinal distance between the frame and the remaining hitch member.

13. A cart for interconnecting a tractor and a farm implement, comprising:
- a frame having elongated front and rearward side members connected by end members;
- ground supporting wheels on the frame at the end members thereof for free rotation about a rotational axis;
- a first elongated tongue member on the frame extending forwardly to an end for connection to the tractor; and
- a second tongue member on the frame, extending rearwardly to an end under the frame for connection to the farm implement;
- wherein the end of the second tongue member is adjustably positionable under the frame between the front and rearward side members such that the overall length of the first and second tongue members is minimized to reduce the effective distance between the tractor and farm implement with the cart interposed therebetween.

* * * * *